(12) United States Patent
Weisse et al.

(10) Patent No.: US 6,451,921 B2
(45) Date of Patent: Sep. 17, 2002

(54) BLOCK COPOLYMERS WITH SULFONATED POLYETHER SULFONE UNITS

(75) Inventors: Hilmar Weisse, Mechernich; Helmut Keul; Hartwig Höcker, both of Aachen, all of (DE)

(73) Assignee: Membrana GmbH, Wuppertal (DE)

( * ) Notice: Subject to any disclaimer, the term of this patent is extended or adjusted under 35 U.S.C. 154(b) by 0 days.

(21) Appl. No.: 09/785,193

(22) Filed: Feb. 20, 2001

(30) Foreign Application Priority Data

Feb. 17, 2000 (DE) .......................... 100 07 272

(51) Int. Cl.⁷ .................. C08F 128/06; C08F 28/06
(52) U.S. Cl. ................ 525/328.5; 525/191; 525/242; 525/321; 525/326.1; 525/535; 528/171; 528/174; 528/391
(58) Field of Search .............................. 525/328.5, 191, 525/242, 321, 326.1, 535; 528/171, 174, 391

(56) References Cited

U.S. PATENT DOCUMENTS

| 3,855,122 A | 12/1974 | Bourganel |
| 4,720,343 A | 1/1988 | Walch et al. |
| 5,009,824 A | 4/1991 | Walch et al. |

FOREIGN PATENT DOCUMENTS

| DE | 31 49 976 A1 | 6/1983 |
| EP | 0 112 724 A1 | 7/1984 |
| EP | 0 182 506 A2 | 5/1986 |
| EP | 0 228 072 A2 | 7/1987 |
| JP | 1009230 | 1/1987 |

*Primary Examiner*—Duc Truong
(74) *Attorney, Agent, or Firm*—Oliff & Berridge, PLC

(57) ABSTRACT

Block copolymers containing blocks of unsulfonated aromatic polyether sulfones and blocks of aromatic polyether sulfones sulfonated on the aromatics are characterized in that the block length of the unsulfonated aromatic polyether sulfones in each case comprises at least 10 repeating units and that the sequence of the main chain at the block transitions between two adjacent blocks of aromatic polyether sulfones is the same as it is inside these blocks. These block copolymers may be prepared by polycondensation, and are preferably used as membranes. The block copolymers provide compounds which in addition to an adjustable degree of sulfonation have a defined length of sulfonated and unsulfonated blocks. As a result, the spectrum of the polymers suitable for the preparation of synthetic membranes can be expanded and graded.

17 Claims, No Drawings

BLOCK COPOLYMERS WITH SULFONATED POLYETHER SULFONE UNITS

BACKGROUND OF THE INVENTION

1. Field of the Invention

The invention pertains to block copolymers containing blocks of unsulfonated aromatic polyether sulfones and blocks of aromatic polyether sulfones sulfonated on the aromatics, as well as a process for the preparation thereof. In addition, the present invention pertains to membranes containing such block copolymers.

2. Discussion of Related Art

The use of synthetic polymers for membranes and separation processes based thereon has been known for a long time. In addition to typical fields of application, such as sea water desalination by means of reverse osmosis or the ultrafiltration of process waters from electric immersion painting for recovery of the lacquer, membrane processes in the fields of food technology, medicine, and pharmacy are becoming increasingly important. In the last-mentioned cases, membrane separation processes have the major advantage that the substances to be separated are not subjected to thermal load or indeed damaged at all.

In addition to the always necessary mechanical and thermal properties, polymers which are suitable for use as constituents and component parts for medical applications must also possess properties which are characteristic of medicine, such as sterilizability in autoclaves very good resistance, even to strong disinfectants biocompatibility in contact with skin, tissue or blood.

Sterilizability is of essential importance when it comes to use as a membrane. Not least for safety reasons and on ecological grounds in that case steam sterilization is to be preferred over chemical sterilization through radiation, especially through gamma radiation.

Ordinarily, the steam sterilization takes place by means of the approximately 30-minute treatment of the membrane with superheated steam of >110° C. The criterion of steam sterilizability thus strongly reduces the number of potential polymers for membranes. For instance, membranes of polyacrylonitrile cannot be steam sterilized on principle, because exceeding the glass temperature of the polymer leads to the material or the membrane being irreversibly damaged. Polymers susceptible to hydrolysis, e.g., some polycarbonates and polyamides, likewise do not survive a superheated steam sterilization without being damaged.

Steam sterilizable membranes of, e.g., polyether imides, polyether sulfones or polyvinylidene fluoride are well-known.

Polyether sulfones fulfill the mechanical and thermal properties requirements and stand out as a result of an excellent resistance to chemicals.

A major drawback to membranes based on, e.g., polyether sulfone is the hydrophobicity of the membrane material, which excludes spontaneous wetting with aqueous media. Because of this it has to be prevented that the membrane dries out completely, or the membrane has to be treated with a hydrophilizing agent, such as glycerol, prior to being dried.

Hydrophilic membranes are remarkable for being wettable with water. A measure of wettability is the contact angle of a drop of water vis-a-vis the membrane surface. In the case of hydrophilic materials, this contact angle will always exceed 90 degrees. Phenomenologically, wetting of a dialysis membrane can also be inferred from the fact that a drop of water introduced onto the membrane surface will penetrate into the membrane after a short time.

A further substantial drawback to hydrophobic materials for use in membranes consists in that they often have a strong, nonspecific adsorption capacity. Hence when hydrophobic membranes are used, often a rapid, tightly adhering coverage of the membrane surface with preferably high-molecular weight solvent constituents takes place. This phenomenon known as fouling leads to a rapid deterioration of the membrane permeability. A subsequent treatment of the membrane with a hydrophilizing agent will not permanently prevent the fouling.

Proposals have been made for the use as membrane material of hydrophilic polymers/polymer systems said not to have the aforementioned drawbacks. Thus in German published application DE-OS 3 149 976, it is proposed that for the preparation of a hydrophilic membrane, use be made of a polymerizate mixture which in addition to polysulfone or polyamide contains at least 15 wt. % of polyvinyl pyrrolidone. For the hydrophilizing of, e.g., polyimide and polyether sulfone membranes, EP-A-0 228 072 claims the use of polyethylene glycol in amounts of 44 to 70 wt. %, calculated on the polymer solution.

The hydrophilizing of membranes by using large amounts of water-soluble polymers has the drawback, however, that the hydrophilicity of the membrane steadily declines when it is used in aqueous media, since the water-soluble polymer is washed out. This can lead to the membrane material regaining its original hydrophobicity and exhibiting the aforementioned negative secondary phenomena associated therewith.

The drawbacks can be avoided by the use of hydrophilic, yet water-insoluble polymers for the preparation of membranes. Thus in a series of patents, e.g., EP-A-0 182 506 and U.S. Pat. No. 3,855,122, the preparation of membranes from sulfonated polymers is claimed. However, the processes described there are suitable only for the preparation of flat membranes. The membranes have a high salt retention capacity and are primarily eligible for use in reverse osmosis.

DE-OS 3 149 976 proposes the preparation of aromatic polyether sulfones by sulfonation with the aid of a solution of sulfur trioxide in sulfuric acid, with the content of sulfur trioxide, calculated on the total amount of pure sulfuric acid present in the reaction mixture, being kept at a value of less than 6 wt. % during the entire period of sulfonation.

In this way the degree of sulfonation, i.e., the quotient of the total number of sulfonic acid groups in the polymer and the total number of repeating monomer units, should be easily controllable; however, it is not possible to set other than a random distribution of the sulfonic acid groups in the polymer.

However, for regulation of the biocompatibility, it is desirable when not only the total number of sulfonic acid groups in the polymer, but also their distribution in the polymer chain can be influenced. By the selective introduction of, e.g., domains with high and low degrees of sulfonation, the variational possibilities with respect to the functional polymer groups can be increased and thus, e.g., the hydrophilicity properties can be graded even more selectively.

Such block copolymers containing blocks of sulfonated and unsulfonated polyether sulfones are known, e.g., from JP 1009230. In this document, a block copolymer of polyether sulfone and sulfonated polyether sulfone is described which is prepared using α,α'-dichloro-p-xylene as coupling reagent and where the block transitions are made up of aliphatic groups, which may lead to inhomogeneities and, at worst, to weak points in the chain. Moreover, aliphatic groups may enter into unfavourable interactions with blood and for that reason their presence in, e.g., haemodialysis membranes is highly undesired.

Finally, EP-A-112724 describes a process for sulfonating polysulfones containing repeating units of the formula —Ph—$SO_2$—Ph—O—, wherein the polysulfone is first of all suspended in a liquid halogenated hydrocarbon and then sulfonated with a sulfonating reagent, such as sulfur trioxide. According to EP-A-112724, the sulfonated product can resemble to a certain degree that of a block copolymer with alternating regions of highly sulfonated and unsulfonated chain sequences. The document does not pronounce on the length of the sulfonated and unsulfonated sequences, respectively. Moreover, EP-A-112724 does not disclose either whether and in which way these sequence lengths can be controlled. The document even leaves open whether in the described process it is actually block copolymers which are formed, since there is talk only of a resemblance to or the appearance of the existence of block copolymers. EP-A-112724 is consistently directed to the sulfonation of polysulfones, and not to a process for the preparation of block copolymers.

SUMMARY OF THE INVENTION

The invention has for its object to provide block copolymers containing blocks of unsulfonated aromatic polyether sulfones and blocks of aromatic polyether sulfones sulfonated on the aromatics, as well as a process for the preparation thereof, with the drawbacks of the prior art at least being reduced.

This object is achieved by means of block copolymers containing blocks of unsulfonated aromatic polyether sulfones and blocks of aromatic polyether sulfones sulfonated on the aromatics which are characterized in that the length of the blocks of unsulfonated aromatic polyether sulfones in each case comprises at least 10 repeating units, and in that the sequence of the main chain at the block transitions between two adjacent blocks of aromatic polyether sulfones is the same as that inside these blocks.

DETAILED DESCRIPTION OF PREFERRED EMBODIMENTS

Although there is no upper limit for the block length of the unsulfonated aromatic repeating units on principle, block copolymers with an upper limit of about 100 unsulfonated repeating units are preferred.

In the case of the block copolymers according to the invention, a block length of the unsulfonated aromatic polyether sulfones of always between 30 and 100, more preferably between 50 and 100, repeating units is especially preferred.

Aromatic polyether sulfones in this case means in the first place polymers where the sequence of the main chain has a sulfone group between two aromatic groups and an ether bond between two aromatic groups, where the two aromatic groups between which the sulfone group is present are each connected to a further aromatic group by means of an ether bond. By sequence of the main chain is thus meant in this case the sequence of the atoms forming the polymer chain and their bonds to one another. In the case of branched polymers, the main chain is the longest unbranched chain. Typical sequences for polyether sulfones can be described, e.g., by the n-fold succession of monomeric repeating units, such as —[—O—Ph—$SO_2$—Ph—]—. In this case Ph stands for the aromatic group and n for the number of repeating units in the polymer.

The term aromatic polyether sulfone (PES), however, also pertains to polymers of which the main chain sequence first of all has two or more successive aromatic groups connected by ether groups before the next sulfone group follows between two aromatic groups, as is for instance the case in a polyether ether sulfone (PEES). Such sequences can for instance be described by the n-fold succession of monomeric repeating units, such as —[—O—Ph—O—Ph—$SO_2$—Ph—]—. Alternatively, of course, it is also possible to have first of all two or more aromatic groups connected by sulfone groups following one another, before the next ether group follows between two aromatic groups.

The cross-linking of the aromatic groups with the corresponding substituents can in each case take place in the ortho-, meta-, or para-position. Optionally, the aromatic groups will carry further substituents.

Preferred within the framework of the present invention are those block copolymers where the cross-linkings take place in the para-position.

The term "sulfonated" is taken to mean above all the presence of sulfonic acid groups on the aromatic rings, in which case technically a hydrogen atom connected to the aromatic ring of the ether sulfone unit is replaced by a sulfonic acid group. For many application purposes the sulfonated polymer is less suitable in the form of free sulfonic acid groups than in the form of their salts, e.g., metal salts or ammonium salts. The conversion to these salts can take place through neutralization with the corresponding bases in a solvent. For that reason the term "sulfonated" also encompasses these salts.

For the rest, sulfonated and unsulfonated polyether sulfones or polyether ether sulfones are well-known to the skilled person and need no further elucidation here.

The block copolymers according to the invention provide compounds which in addition to an adjustable degree of sulfonation also have a defined length of sulfonated and unsulfonated blocks. As a result, the spectrum of the polymers suitable for the preparation of synthetic membranes can be expanded and graded, for instance for a selective setting of the hydrophilicity and the biocompatibility. Block copolymers with blocks of sulfonated and unsulfonated polyether sulfones which have these properties are neither disclosed in the known prior art nor suggested therein.

In the case of particularly suitable block copolymers, the sequence of the total main chain consists of —O—Ph—$SO_2$—Ph— repeating units. Of course, in that case there will be aromatics having sulfonic acid groups in the blocks of sulfonated aromatic polyether sulfones.

In the case of the block copolymers according to the invention, this sulfonation on the aromatic groups can only be found in certain domains of the block copolymer, viz. in the blocks of sulfonated polyether sulfones. The sequence of the main chain is not altered by this.

The degree of sulfonation of the block copolymers is defined as the quotient of the total number of sulfonic acid groups in the polymer and the total number of repeating monomer units. A degree of sulfonation of, say, 0.2 thus means that on average there will be a sulfonic acid group present on every fifth monomer unit, which, e.g., in the case of the block copolymers according to the invention is realized by a block with 80 unsulfonated monomer units, followed by a block with 20 sulfonated monomer units. The degree of sulfonation is decisive for the hydrophilicity and the ion exchange capacity, respectively, of the sulfonated polymer. It can be determined, e.g., by titration of the sulfonic acid groups on the one hand and determination of the monomer units on the other. According to the present invention, however, use is made of spectroscopic methods, which are also suitable when the sulfonic acid groups are present in the form of their salts. In the first place, the determination can be carried out with the aid of a $^1$H-NMR method, as decribed in the literature (*J. Membrane Sci.* 83 (1993) 21). In addition to this, also $^{13}$C-NMR-spectroscopy is suitable for determining the degree of sulfonation. Such quantitative information can be derived from comparing the spectra of, e.g., polyether sulfone and sulfonated polyether sulfone. The skilled person will then be capable of determining the degree of sulfonation via the ratio of intensity of certain carbon signals.

The mentioned ion exchange capacity (IEC), which represents a measure of the hydrophilicity, can be indicated in meq/g. 1 meq/g means that per gram of polymer, 1 mmole of protons can be exchanged for 1/n mmole of an n-valent cation. The IEC can again be determined by titration.

The block copolymers according to the invention can have the same or a different degree of sulfonation in the blocks of aromatic sulfonated polyether sulfones.

Thus, e.g., a degree of sulfonation of 0.2 could be produced in a block copolymer in the first place—as already described above—by means of an alternating series of in each case 80 unsulfonated monomer units (degree of sulfonation in the block=0) and 20 sulfonated monomer units (degree of sulfonation in the block=1); however, a block copolymer with the same degree of sulfonation could also be produced through the alternating sequence of 60 unsulfonated monomer units (degree of sulfonation in the block=0), 15 sulfonated monomer units (degree of sulfonation in the block=1) and 25 sulfonated monomer units (degree of sulfonation in the block=0.2).

The invention is further directed to a process for the preparation of block copolymers containing blocks of unsulfonated aromatic polyether sulfones and blocks of aromatic polyether sulfones sulfonated on the aromatics, which is characterized in that the block copolymers are prepared by the polycondensation of divalent, hydroxylated and/or halogenated, ether and sulfone groups-containing aromatic compounds as coreactants, one of which coreactants additionally is sulfonated on the aromatic ring or the aromatic rings.

By the term "divalent" is meant that the coreactants always provide two functionalities for a condensation reaction. These functionalities are either halogen or hydroxyl groups, which in each case are present as substituents on the aromatic rings or the aromatic ring of the coreactants. The coreactants may contain only the functional groups of one type, i.e., only hydroxyl groups or only halogen groups, as substituents, but of course also both types of functional groups may be present on the same coreactant. In the former case, e.g., aromatic dihalogen compounds will react with aromatic dihydroxyl compounds, in which case two coreactants with different terminal groups are required for the forming of the aromatic polyether sulfones, while in the latter it may be a case of for instance halogenated hydroxyl compounds and as a result of this the coreactants will always have the same terminal groups. Of course also mixtures of different types may be employed, i.e., for instance dihalogen compounds with dihydroxyl compounds and halogenated hydroxyl compounds as coreactants.

The term "coreactant" comprises monomers but is not limited thereto. Needless to say, oligomers or polymers with the corresponding functionalities, i.e., terminal groups, may also be used.

The number of coreactants reacting with one another is not subject to any restrictions on principle.

In the process according to the invention, it is preferred that the poly-condensation of the coreactant is a nucleophilic aromatic substitution. As a result of this, the sequence of the main chain can be maintained and continued at the block transitions in a very simple manner.

It is preferred for the process according to the invention when one of the coreactants used is a hydroxytelechelic polyether sulfone or a hydroxytelechelic polyether sulfone sulfonated on the aromatics.

The term "telechelic" is known to the skilled person. As a rule, it concerns oligomers or low-molecular weight polymers carrying monofunctional terminal groups on both chain ends. According to the present invention, this designation is also used for polymeric and oligomeric substances with defined reactive terminal groups. Thus for instance, the designation hydroxytelechelic polyether sulfone is used for polyether and oligoether sulfones which have hydroxyl groups present on both chain ends.

Hydroxytelechelic polyether sulfones are known. They can be obtained, e.g., by reacting bis(4-hydroxyphenyl) sulfone with bis(4-chlorophenyl)sulfone in a molar ratio of q=0.92 to 0.98 (hydroxyl constituents in excess) in 1,1-dioxothiolane in the presence of potassium carbonate at 200° C.

Hydroxytelechelic, sulfonated polyether sulfones can be obtained by an analogous reaction of the hydroxytelechelic polyether sulfones with oleum. Such a synthesis is disclosed for instance in DE-OS 38 14 759 in the example of the conversion of polyether sulfones into sulfonated polyether sulfones. In that process, the educt is first dissolved in concentrated sulfuric acid, so that an approx. 10 wt. % solution is formed. At about 10° C., the amount of 65%-oleum which is required for the degree of sulfonation aimed for is added. The reaction solution is after-stirred for about 1–2 hours and the product is then obtained by precipitation in water.

The hydroxytelechelic compounds can be characterized by means of conventional methods well-known to the skilled person, with $^1$H-NMR and $^{13}$C-NMR spectroscopy being particularly suitable. In this connection, $^1$H-NMR spectroscopy for instance is not only suitable for making statements about the terminal groups, but it is also possible, through the exchange of suitable signals, to obtain details about the molecular weight of the obtained polymeric or oligomeric compounds.

For the process according to the invention, it is further preferred when one of the coreactants used is a halogentelechelic polyether sulfone or a halogentelechelic polyether sulfone sulfonated on the aromatics.

Halogentelechelic polyether sulfones are made available, e.g., by the reaction of hydroxytelechelic polyether sulfones with an excess of bis(4-halogen-phenyl)sulfone. Preferred halogens are fluorine and chlorine. Thus, the synthesis of the especially preferred fluorotelechelic polyether sulfone proceeds by reacting hydroxytelechelic polyether sulfone with bis(4-fluorphenyl)sulfone, which is used in fourfold molar excess, in 1,1-dioxothiolane at 200° C., followed by precipitation of the reaction solution in water/ethanol (1:1, v/v).

It is advantageous for the process according to the invention when the coreactants sulfonated on the aromatics are first prepared by reacting the corresponding unsulfonated, hydroxylated and/or halogenated ether and sulfone groups-containing, aromatic compounds with the aid of a solution of sulfur trioxide in concentrated sulfuric acid.

This can be done, as was described above on the occasion of the synthesis of the hydroxytelechelic, sulfonated compounds, by means of an analogous conversion using $SO_3$. However, it is also possible that already the monomers are sulfonated in oleum. In this way the halogentelechelic, sulfonated polyether sulfones can be obtained by reacting 3,3'-sulfonyl bis(6-halogenbenzene sulfonic acid) dialkali salt with bis(4-hydroxyphenyl)sulfone in 1,1-dioxothiolane in a molar ratio of the educts q of about 0.85 (halogen constituents in excess). The sulfonated dihalogen compounds are obtained from the corresponding bis(4-halogenphenyl)sulfones. In this way the 3,3'-sulfonyl bis(6-fluorobenzene sulfonic acid) disodium salt can be prepared by the sulfonation of bis(4-fluorophenyl)sulfone in oleum, followed by salting out with common salt.

Likewise for instance also the monomeric sulfonated dihydroxyl compounds can be obtained, by bis(4-hydroxyphenyl)sulfone being sulfonated in 96%-sulfuric acid.

Of course, starting from the previously sulfonated monomeric dihalogen compounds, such as the bis(4-halogenphenyl)sulfones, it is also possible to obtain the hydroxytelechelic sulfonated polyether sulfones. This can easily be done, e.g., by using the corresponding molar excess of bis(4-hydroxyphenyl)sulfone in 1,1-dioxothiolane. The skilled person is capable of determining the corresponding mixing ratios on the basis of his professional knowledge and/or simple routine tests, without a creative act.

Hence it is preferred in the process according to the invention, that for the synthesis of the telechelic coreactants sulfonated on the aromatics use is made of a compound of the following structure:

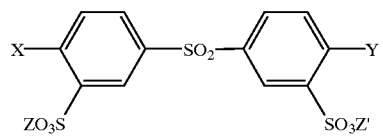

wherein

X and Y may be the same or different and represent the same or different halogen groups, such as fluorine, chlorine, bromine and/or hydroxyl groups;

Z, Z' may be the same or different and represent hydrogen or alkali metal, such as sodium or potassium.

Covered by this structure are compounds such as 3,3'-sulfonyl(6-fluorobenzene sulfonic acid-6-chlorobenzene sulfonic acid) as well as the disodium salt thereof 3,3'-sulfonylbis(6-chlorobenzene sulfonic acid) as well as the dipotassium salt thereof, 3,3'-sulfonylbis(6-hydroxybenzene sulfonic acid) as well as the disodium salt thereof.

Quite especially preferably for the synthesis of the telechelic coreactants sulfonated on the aromatics, use is made of 3,3'-sulfonylbis(6-fluorobenzene sulfonic acid) or the corresponding disodium salt thereof.

It proves to be especially advantageous in the process according to the invention when the polycondensation is carried out in such a way that in the block copolymer being formed the block length of the unsulfonated aromatic polyether sulfones in each case comprises at least 10 repeating units. An upper limit of about 100 unsulfonated repeating units as a rule is considered sufficient here. Preferably, the process should be carried out in such a way that between 30 and 100, more preferably 50 to 100 repeating units are present in the block copolymer.

This can be done, e.g., by reacting a halogentelechelic, sulfonated polyether sulfone with a hydroxytelechelic polyether sulfone, with care having to be taken that the hydroxytelechelic constituent comprises at least 10 repeating units.

The skilled person is easily capable, within the framework of the disclosure of this invention, to select suitable combinations of coreactants, in order to be able to carry out the process according to the invention.

The invention is also directed to synthetic membranes which contain the block copolymers according to the invention and/or the products from the process according to the invention.

The following examples serve to elucidate the present invention and are not to be interpreted as limiting the invention in any way.

Working Technique and Analytics Spectroscopy:

The spectroscopic characterization of the synthesized products and intermediate products as a rule was carried out using NMR spectroscopy (Bruker, Model DPX 300; $^1$H-NMR spectroscopy, 300 MHz; $^{13}$C-NMR spectroscopy, 75 MHz) or IR spectroscopy: (Nicolet, FTIR Spectrometer Avatar 320 with ATR attachment, Thunderdome with germanium crystal).

Gel Permeation Chromatography (GPC):

(Eluent: dimethyl acetamide distilled over $CaH_2$ with an admixture of 1.220 g/l LiCl; HPLC pump: Bischoff; flow: 0.5 ml/min; autosampler: Bischoff 728; injection valve: Bischoff, EPS-120 with rotation high-pressure valve made by Rheodyne with 202.4 µl injection volume).

Column combination:

column temperature 60° C.

MZ-Gel (8.0 mm×50 mm) 100 Å, 10 µm (pre-column)

PL-Gel (7.5 mm×300 mm) 100 Å, 5 µm

MZ-Gel (8.0 mm×300 mm) 500 Å, 10 µm

PL-Gel (7.5 mm×300 mm) 1,000 Å, 5 µm

PL-Gel (7.5 mm×300 mm) 10,000 Å, 5 µm

Differential Refractometer:

Wyatt Optilab 903, 488 nm, analyzer temperature: 25° C. The calibration constant was determined with a dilution sequence of degassed aqueous common salt solution.

Light Scattering Detector:

Wyatt Dawn DSP with argon laser, λ=488 nm, set laser power when carrying out the measurements: 15 mW, fluoresence filter on detectors 7 to 14, analyzer K5 or F2. The calibration constant was determined with degassed toluene (for analysis).

UV Detector:

Carlo Erba Instruments, micro UVIS 20 Measuring and analysis software: Wyatt, Astra 4.5

Solvent and Chemicals:

All solvents are washed using conventional laboratory methods. Some polycondensations are carried out under dry nitrogen as protective gas. To this end, nitrogen of quality 5.0 is dried on a 0.4 nm molecular sieve and potassium finely distributed on alumina. In all cases where water is used, the water used is de-ionized.

The non-synthesized chemicals are employed as purchased: int. al.: bis(4-hydroxyphenyl)sulfone (Merck), bis (4-fluorophenyl)sulfone (Aldrich), bis(4-chlorophenyl) sulfone (Merck)

Washing:

For washing water-soluble polymers there are used as dialysis membranes:

cuprophane flexible membrane type 20 145, Code No. 86274–200001 (Akzo Nobel), exclusion limit for proteins: 1000 Dalton.

Quantitative $^{13}$C-NMR Measurements

To obtain routine $^{13}$C-NMR spectra, the 1H nuclei are decoupled by a permanent decoupling irradiation. The thus effected saturation of the 1H resonances leads to a reinforcement of the $^{13}$C signals as a result of the Nuclear Overhauser Effect (NOE) up to 2.9-fold, which is fully wanted in standard measurements. For quantitative $^{13}$C-NMR measurements this effect is unfavourable, since different $^{13}$C nuclei are reinforced differently and thus the relative intensities are not only determined by the frequencies of the nuclei in question, but also by differing strong NOEs. In the Inverse-Gated-Decoupling pulse sequence (cf. J. K. M. Sanders, B. K. Hunter, *Modern NMR-Spectroscopy*, Oxford University Press, 1988) the decoupler for that reason is only turned on when recording the Free Induction Decay (FID). In this period the saturation of the $^1$H resonances is not achieved and no different reinforcement of the $^{13}$C nuclei is effected by the NOE. Furthermore, after each pulse the system has to be completely relaxed again. The relaxation time $T_{eff}$ of $^{13}$C nuclei in polymers is up to 0.3 s. The pause between the pulses should be at least $5T_{eff}$. For security, however, a pause of 10 s is maintained between each pulse. The small gyromagnetic ratio of the $^{13}$C nucleus, its low frequency, and the prevention of NOE lead to a comparatively low sensitivity of the measurement. In order to still arrive at an acceptable signal-noise ratio (SN) of at least 50, the number of pulses (NS) should be correspondingly high, as in the case of FT-NMR spectrometers SN $(NS)^{1/2}$ holds. Frequently 5,000 pulses were recorded in the quantitative $^{13}$C-NMR measurements, which resulted in measuring times of about 14 hours. By multiplying the measured FID by an exponential function with a line broadening factor of 3, the SN was increased still further in all analyses carried out. Finally, before the digital integration of the signals also a base line correction of the spectra was carried out.

I. Monomer Syntheses a) 3,3'-Sulfonyl Bis(6-hydroxybenzene Sulfonic Acid) Disodium Salt 75.09 g of bis(4-hydroxyphenyl)sulfone were dissolved, with stirring, in 50 ml 96%-sulfuric acid, heated to 100° C., and kept at this temperature for 48 hours. After pouring of the reaction mixture into water and the addition of common salt up to saturation of the solution, the product precipitates as a white deposit. It is syphoned off and recrystallized from 370 ml ethanol/H$_2$O (4:1). A further fraction is obtained after concentrating the mother liquor and renewed crystallization. 40.20 g (30% yield) of 3,3'-sulfonyl bis(6-hydroxybenzene sulfonic acid) disodium salt are obtained in the form of fine white needles. The melting or decomposition point is above 250° C. The characterization takes place with $^1$H-NMR and $^{13}$C-NMR spectroscopy.

b) 3,3'-sulfonyl Bis(6-fluorobenzene Sulfonic Acid) Disodium Salt 50.45 g of bis(4-fluorophenyl)sulfone were dissolved in 50 ml of oleum in a round-bottomed flask with a drying conduit under cooling with ice and stirring. After 45 minutes of stirring with cooling with ice the reaction mixture is kept at 40° C. for 4 hours and then poured out into 1 l of water and cooled. The product is salted out with common salt, washed with a saturated aqueous common salt solution, and recrystallized from 710 ml ethanol/water (11:1). 25.32 g (28% yield) of product are obtained in the form of clear needles, which by drying under high vacuum at 120° C. crumble to a white, hygroscopic powder, which to prevent renewed water uptake is stored under nitrogen. The melting or decomposition point is above 250° C. The characterization takes place with $^1$H-NMR and $^{13}$C-NMR spectroscopy.

c) 3,3'-sulfonyl-(6-fluorobenzene Sulfonic Acid-6'-chlorobenzene Sulfonic Acid) Disodium Salt g of 4-[4-(fluorophenyl)sulfonyl]chlorobenzene (synthesis as described in *Chem. Ber.* 86 (1953) 172) are dissolved in 10 ml 60%-oleum in a round-bottomed flask with a drying conduit under cooling with ice and stirring. The solution is allowed to thaw to 10° C. and the cooling bath is kept at 10° C. for another 3 hours. Into the reaction mixture are charged 30 ml of water and the product is salted out with common salt. It precipitates as a white deposit, is syphoned off, washed with a saturated common salt solution, and recrystallized from 100 ml ethanol/water 5:1. 3,3'-sulfonyl-(6-fluorobenzene sulfonic acid-6-chlorobenzene sulfonic acid) disodium salt precipitates as clear fine needles, which crumble after drying under high vacuum at 150° C. Obtained is 1.69 g of product (48% yield). The melting or decomposition point is above 250° C. The characterization takes place with $^1$H-NMR and $^{13}$C-NMR spectroscopy.

d) 3,3'-sulfonyl Bis(6-chlorobenzene Sulfonic Acid) Dipotassium Salt 57.44 g of bis(4-chlorophenyl)sulfone are dissolved in 60%-oleum in a round-bottomed flask with a drying conduit under cooling with ice and stirring, heated to 120° C., and kept at this temperature overnight. The reaction mixture is added to water and the product is salted out with potassium chloride. It precipitates as a white deposit, is syphoned off, washed with a saturated potassium chloride solution, and recrystallized from ethanol/water (5:4). 65.4 g (62% yield) are obtained as product in white needles, which crumble to a white powder by drying under high vacuum at 120° C. The melting or decomposition point is above 250° C. The characterization takes place with $^1$H-NMR and $^{13}$C-NMR spectroscopy.

II. Polymer Syntheses (Syntheses of the Telechelics)

a) Hydroxytelechelic Polyether Sulfone

In a Schlenk flask equipped with a magnetic stirrer and a reflux condenser 37.541 g of bis(4-hydroxyphenyl)sulfone are dissolved in 200 ml of 1,1-dioxothiolane at 60° C. To this solution are added 21.8 g of potassium carbonate and 20 ml of water. After 30 minutes of stirring at 60° C., the water is distilled off within one hour with a membrane pump at 15 mbar and 120° C. and subsequently 40.059 g of bis(4-chlorophenyl)sulfone (q=0.93) is added. The reaction mixture is heated under vacuum (160 mbar) to 200° C. and kept under these conditions for 6 hours. The formed light-brown solution is slowly fed to a mixture of 1 l of water and 1 l of ethanol. The formed deposit is syphoned off, finely ground with a mortar, and then extracted for one hour with a boiling mixture of ethanol/water (1:1 v/v) in order to remove occluded salts. The isolated deposit is extraced twice more with boiling ethanol for 30 minutes, to completely remove the remaining 1,1-dioxothiolane. After the washing process the white, powdery product is first dried in a vacuum drying cabinet at 10 mbar and 70° C. and then under high vacuum at 110° C. The product is obtained in a yield of 61.2 g (98% of theory) and has an Mn of about 7,200 (determined by $^1$H-NMR). The product is used, int. al., for the preparation of fluorotelechelic polyether sulfones (see below).

b) Fluorotelechelic Polyether Sulfone

In a Schlenk flask equipped with a magnetic stirrer and a reflux condenser 60 g of the hydroxytelechelic polyether sulfone obtained as specified in II a) are dissolved in 300 ml of 1,1-dioxothiolane at 60° C. To this solution are added 2.76 g of potassium carbonate and 10 ml of water. After 30 minutes, the water is distilled off with a membrane pump at 15 mbar and 120° C. and subsequently 15.2 g of bis-(4- fluorophenyl)sulfone are added. The reaction mixture is heated under vacuum (160 mbar) to 200° C. and kept under these conditions for 6 hours. The formed light-brown solution is poured slowly into water/ethanol (1:1, v/v). The formed deposit is syphoned off, ground finely with a mortar, and then extracted with a boiling mixture of water/ethanol (1:1, v/v) for 1 hour, in order to remove occluded salts. The isolated deposit is extraced twice more with boiling ethanol for 30 minutes, to completely remove the remaining 1,1-dioxothiolane and excess bis-(4-fluorophenyl)sulfone. After the washing process, the white product is dried under high vacuum at 110° C. Obtained are 61.9 g (95% of theory) with an Mn of about 4,800 (determined by $^1$H-NMR).

c) Hydroxytelechelic, Sulfonated Polyether Sulfone

In a Schlenk flask equipped with a magnetic stirrer and a reflux condenser 8.755 g of bis(4-hydroxyphenyl)sulfone are dissolved in 120 ml of 1,1-dioxothiolane at 60° C. To this solution are added 5.08 g of potassium carbonate and 30 ml of water. After 30 minutes of stirring, 240 ml of chlorobenzene are added. The water and chlorobenzene are distilled off completely with the aid of a distillation bridge, with the last remaining chlorobenzene being driven out with dry nitrogen. To the thus formed white suspension are added at about 100° C. 15.381 g of 3,3'-sulfonyl bis(6-chlorobenzene sulfonic acid) dipotassium salt. The reaction mixture is heated to 230° C. under a dry nitrogen atmosphere and kept at this temperature for 6 hours. The formed light-brown solution is poured into five times as much acetone, with the crude product precipitating as a white to light-brown deposit. The crude product is syphoned off, dissolved in a little water, and the solution is dialyzed with water as dialyzate. The dialyzate is concentrated in a rotation evaporator and freed of water by freeze drying and dried under high vacuum at 150° C. Obtained are 12.77 g (58% of theory) with an Mn of about 9,100 (determined by GPC light scattering).

d) Fluorotelechelic, Sulfonated Polyether Sulfone

In a Schlenk flask equipped with a magnetic stirrer and a reflux condenser 2.374 g of bis(4-hydroxyphenyl)sulfone are dissolved in 45 ml of 1,1-dioxothiolane at 60° C. To this solution are added 1.11 g of sodium carbonate and 3 ml of water. After 30 minutes of stirring, 30 ml of chlorobenzene are added. The water and chlorobenzene are distilled off completely with the aid of a distillation bridge, with the last remaining chlorobenzene being distilled off at 160° C. and 250 mbar. To the thus formed white suspension are added at about 100° C. 5.116 g of 3,3'-sulfonyl bis(6-fluorobenzene sulfonic acid) disodium salt. The reaction mixture is heated to 195° C. under a dry nitrogen atmosphere and kept at this temperature for 10 hours. The formed light-brown solution is poured into five times as much acetone, with the crude product precipitating as a white to light-brown deposit. The crude product is syphoned off, dissolved in a little water, and the solution is dialyzed with water as dialyzate. The dialyzate is concentrated in a rotation evaporator and freed of water by freeze drying and dried under high vacuum at 150° C. Obtained are 4.58 g (73% of theory) with an Mn of about 7,800 (determined by $^1$H-NMR).

III. Analogous Sulfonation a) Synthesis variant 1

In a double-walled 500 ml three-neck flask equipped with a KPG stirrer, a dropping funnel, and an internal thermometer, which is kept at a constant temperature of 10° C. by a cryostat, the compound to be sulfonated is dissolved in concentrated sulfuric acid, so that a 10 wt. % solution is formed. When the compound is completely dissolved in the sulfuric acid, the amount of 65%-oleum required for the aimed at degree of sulfonation is added dropwise, with as vigorous stirring as possible, to the solution in such a way that the internal temperature of 15° C. is not exceeded. The amount of sulfuric acid and oleum is calculated such that in the reaction solution, a certain amount of free $SO_3$ is formed, which reacts with the compound to be sulfonated and produces an equimolar amount of sulfonated aromatics in the compound. In the synthesis, attention has to be paid to the exclusion of moisture. Furthermore, the oleum has to drop into the reaction solution as directly as possible, since otherwise $SO_3$ will crystallize on the cold glass wall of the reaction vessel. After the dropwise addition, the reaction solution is after-stirred for one hour at 10° C. After that, the further cooled reaction solution is poured into 20 to 30 times as much water.

b) Synthesis Variant 2

The procedure is as in synthesis variant 1. However, after the dropwise addition of the oleum the reaction solution is after-stirred for 12 hours at 30° C. After that it is poured into 20 to 30 times as much water.

Processing Variant 1 for Water-soluble Sulfonated Reaction Products

The reaction solution diluted with the same amount of water is dialyzed several times in dialysis membranes with water as dialyzate, until the mother liquor can no longer be distinguished from water as regards its pH value. The dialysis residue is concentrated to about ¹⁄₁₀ of its volume on a rotation evaporator and freed of most of the water by freeze drying. The last remaining water is removed under high vacuum at 120° C. The sulfonated reaction products are hygroscopic and hence are stored under dry nitrogen.

For the preparation of the corresponding sodium sulfonate an aqueous solution is prepared, to which sodium hydrogen carbonate is added until the solution no longer shows an acid reaction. The product solution is dialyzed three times within 36 hours in dialysis membranes with the 20 to 30-fold amount of water as dialyzate. Drying under high vacuum takes place at 150° C.

Processing Variant 2 for Water-insoluble Sulfonated Reaction Products

If the precipitated sulfonated reaction product is filamentary, it is extracted cold with water several times, until the extract can no longer be distinguished from the water used for the extraction as regards the pH value. If on the other hand the product is powdery, it is syphoned off with the Büchner funnel and washed several times with water, until the washing water in terms of the pH value is no longer distinguishable from its starting value. The product is pre-dried on a rotation evaporator. The last remaining water is removed under high vacuum at 120° C.

For the preparation of the corresponding sodium sulfonate the product is dissolved in N,N-dimethyl acetamide, about 10 vol % of water is added, and sodium carbonate is added until the solution no longer shows an acid reaction. The solution is poured into five times as much water. When the product is water-soluble, there is further processing as in processing variant 1. When the product is not water-soluble, processing takes place as described above for water-insoluble sulfonated products. Drying under high vacuum proceeds in any case at 150° C.

EXAMPLE 1

Block Copolymers of Hydroxytelechelic Sulfonated Polyether Sulfones and Fluorotelechelic Polyether Sulfones In a Schlenk flask equipped with a magnetic stirrer and a reflux condenser 19.17 g of hydroxytelechelic, sulfonated polyether sulfone (Mn≈14,900, according to $^1$H-NMR, prepared as described in III a) of a hydroxytelechelic polyether sulfone with an Mn of about 5,000) are dissolved in 100 ml of 1,1-dioxothiolane at 60° C. To this solution, 10 ml of water are added and potassium carbonate until the solution shows an alkaline reaction. After 30 minutes of stirring, the solution is heated to 120° C. and for 3 hours kept at this temperature and a pressure of 10 mbar. To the reaction solution are added at about 100° C. 20.0 g of fluorotelechelic polyether sulfone (Mn≈4,800, according to $^1$H-NMR, as described in II b)). The reaction mixture is heated to 200° C. and kept at a pressure of 100 mbar for 10 hours. The formed light-brown solution is poured into five times as much water, with the product precipitating as a voluminous gel. It is extracted cold with water several times, until the extract no longer differs from water in term of pH value. The product is syphoned off with a Büchner funnel and dried at 100° C. and 10 mbar. The yield is 38 g (97% of theory). The formed block copolymer has an Mn of about 13,100 (determined by GPC light scattering) and the block length of the unsulfonated aromatic polyether sulfones is about 30 repeating units. The degree of sulfonation of the block copolymer is about 0.1 (according to $^{13}$C-NMR). This block copolymer was processed in polymer mixtures with polyether sulfone into polymer films. The sequence of the main chain at the block transitions between two adjacent blocks of sulfonated and unsulfonated polyether sulfones is, according to $^{13}$C-NMR, the same as it is inside these blocks.

It could be shown that compared with films of polyether sulfone and films of polymer mixtures of polyether sulfone and sulfonated polyether sulfone with a comparable degree of sulfonation, films of polymer mixtures containing the block copolymer according to the invention have an improved compatibilty with blood.

EXAMPLE 2
Block Copolymers of Hydroxytelechelic Polyether Sulfones and Fluorotelechelic Sulfonated Polyether Sulfones In a 100 ml Schlenk flask equipped with a magnetic stirrer and a reflux condenser 1.71 g of hydroxytelechelic polyether sulfone (Mn≈6,100 according to $^1$H-NMR, prepared as described in II a)) are dissolved in 30 ml of N,N-dimethyl acetamide at 60° C. To this solution are added 0.033 g of sodium carbonate and 1 ml water. After 30 minutes of stirring, 30 ml of toluene are added. The water and toluene are distilled off completely with the aid of a distillation bridge, with the last remaining toluene being driven out with dry nitrogen. To the reaction solution are added at about 100° C. 2.18 g of fluorotelechelic sulfonated polyether sulfone (Mn≈7,800 according to $^1$H-NMR, as described in II d)). The reaction mixture is heated under an atmosphere of dry nitrogen and a superatmospheric pressure of 1 bar to 170° C. and kept at this temperature for 5 hours. The formed light-brown solution is poured into five times as much acetone, with the crude product precipitating as a white deposit. It is syphoned off and charged to 100 ml of water, with the powdery product strongly swelling in water. Voluminous, transparent, clear hydrogel particles are formed, which are extracted in cold water for 1 hour and are syphoned off with a Büchner funnel. The aqueous extract is dialyzed with water as dialyzate and freed of water by freeze drying. Obtained is 0.57 g of a pulverulent, clear, tranparent substance as side fraction. The formed 12.6 g of hydrogel are freed of water by freeze drying followed by drying under high vacuum at 100° C. As main fraction, 1.94 g of a clear powder are obtained. The total yield of the two fractions is 65%.

In the $^{13}$C-NMR spectra of the block copolymers one finds, in addition to the typical signals for C-atoms in the sulfonated and unsulfonated blocks, also signals for C-atoms at the block transitions. On the basis of the intensities of all signals, the Mn of the blocks in the block copolymers can be calculated.

In the case of the main fraction-block copolymer, the Mn of the sulfonated polyether sulfone block is≈7,300, the Mn of the unsulfonated polyether sulfone block is≈8,800. Thus the block length of the unsulfonated aromatic polyether sulfones is about 38 repeating units. The degree of sulfonation of the block copolymer is about 0.3 (according to $^{13}$C-NMR). The $^{13}$C-NMR tests of the formed block copolymer show that the sequence of the main chain at the block transitions between two adjacent blocks of sulfonated and unsulfonated polyether sulfones is the same as it is inside these blocks.

EXAMPLE 3
Block Copolymer of Hydroxytelechelic polyether Sulfone and Sulfonated Monomer Units In a Schlenk flask equipped with a magnetic stirrer and a reflux condenser 5.00 g of bis(hydroxyphenyl)sulfone are dissolved in 20 ml of 1,1-dioxothiolane at 60° C. To this solution are added 2.33 g of sodium carbonate and 5 ml water. After 30 minutes of stirring 30 ml of chlorobenzene are added. The water and chlorobenzene are distilled off completely with the aid of a distillation bridge, with the last remaining chlorobenzene being driven out with dry nitrogen. To the formed white suspension there is added at 215° C. a solution of 92.8 g of polyether sulfone (Ultrason E6020P, BASF) in 400 ml of 1,1-dioxothiolane. In order to completely exclude traces of water, the polyether sulfone solution was subjected to azeotropic concentration with 100 ml of chlorobenzene. The reaction mixture is kept under an atmosphere of dry nitrogen at 215° C. for 30 minutes, whereupon hydroxytelechelic polyether sulfones are formed in situ. Next, 9.17 g of dry 3,3'-sulfonyl(6-fluorobenzene sulfonic acid) disodium salt are added to the reaction mixture. The reaction mixture is kept at 215° C. for another 6 hours.

The formed light-brown solution is poured into five times as much acetone, with the crude product precipitating as a white deposit. It is syphoned off, charged to 5 1 water, extracted in cold water for 1 hour, and syphoned off with a Büchner funnel. After drying in a vacuum drying cabinet at 110° C. and 10 mbar, 97 g of clear product are obtained.

What is claimed is:

1. Block copolymers containing blocks of unsulfonated aromatic polyether sulfones and blocks of aromatic polyether sulfones sulfonated on the aromatics, wherein the unsulfonated aromatic polyether sulfones in each case have a block length comprising at least 10 repeating units and wherein a sequence of a main chain at block transitions between two adjacent blocks of aromatic polyether sulfones is the same as it is inside the blocks of aromatic polyether sulfones.

2. Block copolymers according to claim 1, wherein the block length of the unsulfonated aromatic polyether sulfones in each case is in the range of 30 to 100 repeating units.

3. Block copolymers according to claim 1, wherein the block length of the unsulfonated aromatic polyether sulfones in each case is in the range of 50 to 100 repeating units.

4. Block copolymers according to claim 1, wherein the sequence of the main chain consists of —O—Ph—SO$_2$—Ph— repeating units.

5. A process for preparing block copolymers containing blocks of unsulfonated aromatic polyether sulfones and blocks of aromatic polyether sulfones sulfonated on the aromatics, wherein the block copolymers are prepared by polycondensing divalent, hydroxylated or halogenated or both, ether and sulfone groups-containing aromatic compounds as coreactants, one of which coreactants additionally is sulfonated on the aromatic ring or aromatic rings.

6. A process according to claim 5, wherein the polycondensing of the coreactants is a nucleophilic aromatic substitution.

7. A process according to claim 5, wherein one of the coreactants used is a hydroxytelechelic polyether sulfone or a hydroxytelechelic polyether sulfone sulfonated on the aromatic ring or rings.

8. A process according to claim 5, wherein one of the coreactants is a halogentelechelic polyether sulfone or a halogentelechelic polyether sulfone sulfonated on the aromatic ring or rings.

9. A process according to claim 5, wherein the coreactants sulfonated on the aromatic ring or rings are first prepared by reacting the corresponding unsulfonated, hydroxylated or halogenated or both, ether and sulfone groups-containing aromatic compounds with the aid of a solution of sulfur trioxide in concentrated sulfuric acid.

10. A process according to claim 7, wherein the hydroxytelechelic polyether sulfone coreactant sulfonated on the aromatic ring or rings is synthesized from a compound of the following structure:

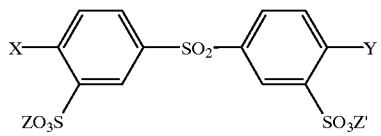

wherein
X and Y may be the same or different and represent the same or different hydroxyl groups, Z, Z' may be the same or different and represent hydrogen or alkali metal.

11. A process according to claim 10, wherein the alkali metal is sodium or potassium.

12. A process according to claim 8, wherein the halogentelechelic polyether sulfone coreactant sulfonated on the aromatic ring or rings is synthesized from a compound of the following structure:

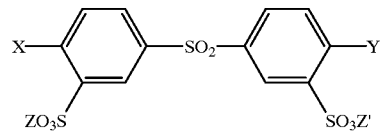

wherein
X and Y may be the same or different and represent the same or different halogen groups, Z, Z' may be the same or different and represent hydrogen or alkali metal.

13. A process according to claim 12, wherein the halogen groups are selected from the group consisting of fluorine, chlorine and bromine.

14. A process according to claim 12, wherein the alkali metal is sodium or potassium.

15. A process according to claim 12, wherein the halogentelechelic polyether sulfone coreactant sulfonated on the aromatic ring or rings is synthesized from 3,3'-sulfonyl bis(6-fluorobenzene sulfonic acid) or the corresponding disodium salt.

16. A process according to claim 5, wherein the polycondensing is carried out such that in the block copolymer, a block length of the unsulfonated aromatic polyether sulfones in each case comprises at least 10 repeating units.

17. A synthetic membrane containing the block copolymer according to claim 1.

* * * * *